(12) United States Patent
Cho et al.

(10) Patent No.: US 10,311,325 B2
(45) Date of Patent: Jun. 4, 2019

(54) IMAGE PROCESSING METHOD AND IMAGE PROCESSING APPARATUS

(71) Applicant: CANON KABUSHIKI KAISHA, Tokyo (JP)

(72) Inventors: Genki Cho, Kawasaki (JP); Toshihiko Mimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/974,458

(22) Filed: May 8, 2018

(65) Prior Publication Data

US 2018/0260654 A1 Sep. 13, 2018

Related U.S. Application Data

(63) Continuation of application No. 14/734,937, filed on Jun. 9, 2015, now Pat. No. 9,996,762.

(30) Foreign Application Priority Data

Jun. 11, 2014 (JP) .................. 2014-120155

(51) Int. Cl.
| | |
|---|---|
| *G06K 9/46* | (2006.01) |
| *G06T 1/60* | (2006.01) |
| *G06T 7/73* | (2017.01) |
| *G06T 7/12* | (2017.01) |

(52) U.S. Cl.
CPC .............. *G06K 9/4609* (2013.01); *G06T 1/60* (2013.01); *G06T 7/12* (2017.01); *G06T 7/73* (2017.01); *Y10T 74/20305* (2015.01)

(58) Field of Classification Search
CPC ...................... G06T 7/0002; G06T 5/50; G06T 2207/10004; G06K 9/46

USPC .......................................... 382/286
See application file for complete search history.

(56) References Cited

U.S. PATENT DOCUMENTS

| | | | | |
|---|---|---|---|---|
| 2005/0169537 A1* | 8/2005 | Keramane | ............ | H04N 19/176 |
| | | | | 382/232 |
| 2008/0317378 A1* | 12/2008 | Steinberg | .................. | G06T 5/50 |
| | | | | 382/275 |
| 2010/0265354 A1* | 10/2010 | Kameyama | ............ | H04N 19/17 |
| | | | | 348/222.1 |

(Continued)

FOREIGN PATENT DOCUMENTS

| | | |
|---|---|---|
| CN | 101061512 A | 10/2007 |
| CN | 101504727 A | 8/2009 |

(Continued)

*Primary Examiner* — Amandeep Saini
(74) *Attorney, Agent, or Firm* — Canon U.S.A., Inc. I.P. Division

(57) ABSTRACT

An image processing apparatus performs an image recognition process, such as pattern matching or contour detection, on image data supplied from an image pickup device, and stores history data of the image recognition process in an external storage apparatus. In this case, an extraction image is extracted from an extraction region determined in accordance with the image recognition process performed on the input image data and is stored in the external storage device as history data. Furthermore, the history data logged in the external storage device may include a compressed image that is obtained by compressing, using lossy compression, the entire image data subjected to the image processing performed by the image processing apparatus.

22 Claims, 8 Drawing Sheets

(56) References Cited

U.S. PATENT DOCUMENTS

2013/0265421 A1* 10/2013 Jia .................... G06K 9/00241
348/143

FOREIGN PATENT DOCUMENTS

| CN | 101673342 A | 3/2010 |
|----|-------------|--------|
| CN | 102737249 A | 10/2012 |
| CN | 103632130 A | 3/2014 |
| JP | 2009-273005 A | 11/2009 |

\* cited by examiner

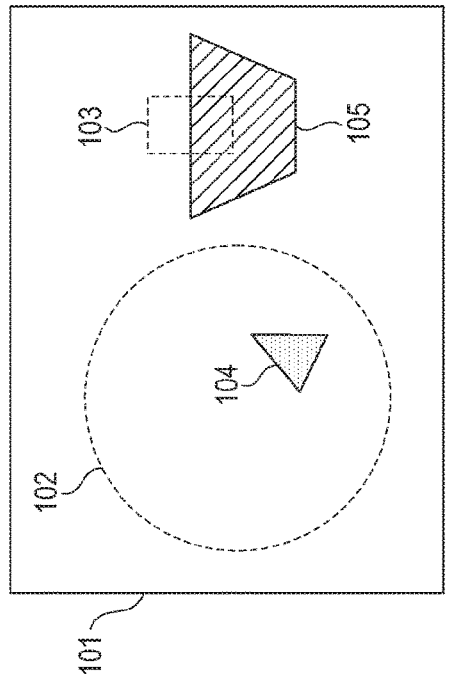
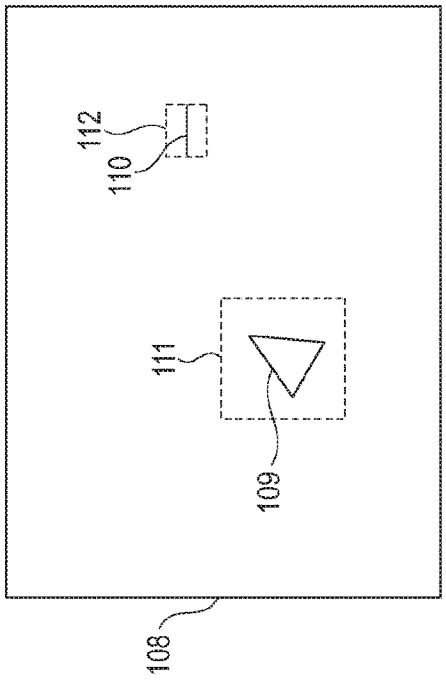
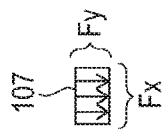
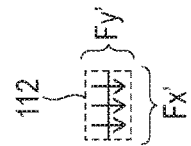
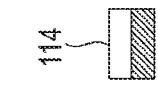
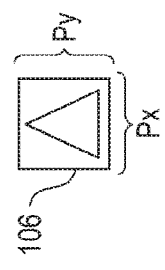
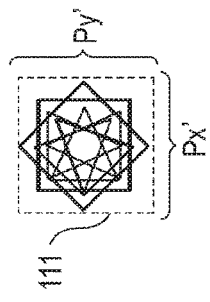
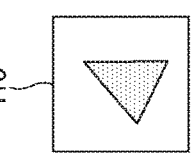

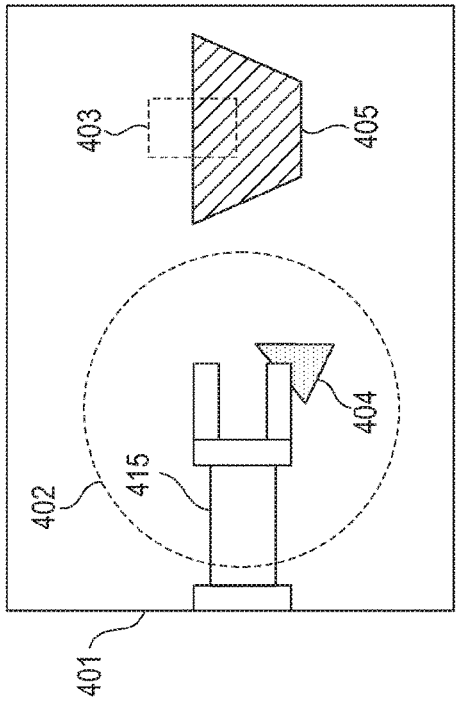
FIG. 4A
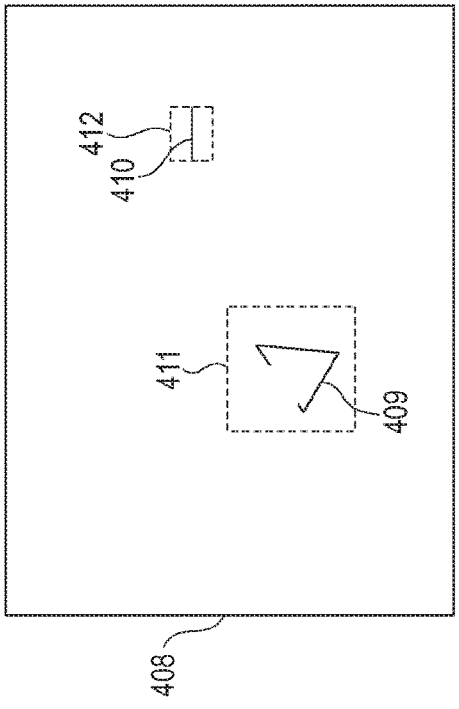
FIG. 4B
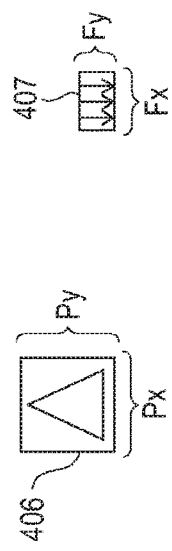
FIG. 4C
FIG. 4D
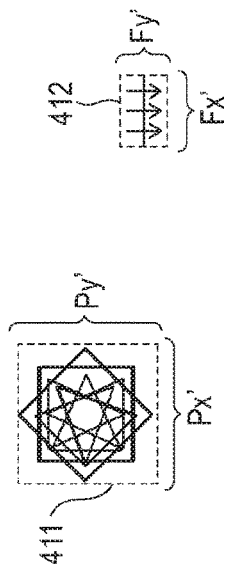
FIG. 4E
FIG. 4F
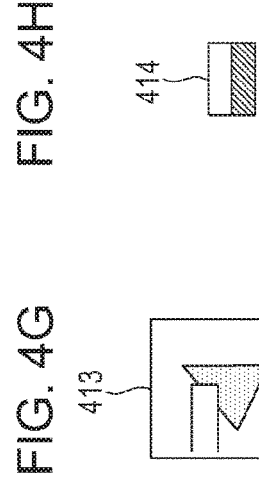
FIG. 4G
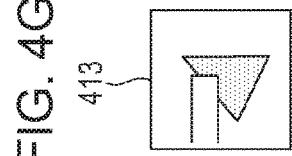
FIG. 4H

IMAGE PROCESSING METHOD AND IMAGE PROCESSING APPARATUS

CROSS-REFERENCE TO RELATED APPLICATIONS

This application is a continuation, and claims the benefit, of U.S. patent application Ser. No. 14/734,937, presently pending and filed on Jun. 9, 2015, and claims the benefit of, and priority to, Japanese Patent Application No. 2014-120155, filed in Jun. 11, 2014, which applications are hereby incorporated by reference herein in their entireties.

BACKGROUND

Field

Aspects of the present invention generally relate to an image processing method for performing image processing on an input image and storing data on the image associated with the image processing and an image processing apparatus.

Description of the Related Art

Image processing apparatuses that perform measurement of a position and a phase of a captured object, detection of a specific portion or an entire member, inspection of a surface state, quality inspection, and the like through image processing performed on an image captured by an image pickup apparatus (such as a digital still camera) have been widely used.

Such an image processing apparatus may include a storage device that stores (accumulates or logs) image data. As the storage device, an external storage device, such as a fixed or removable HDD (Hard Disk Drive) or SSD (Solid State Drive), is used. Such an image processing apparatus including a storage device that records image data may record image data to be processed or image data generated in image processing every time the image processing is performed.

Such an image processing apparatus may not obtain an expected result of image processing performed on a specific image, and accordingly, the image processing apparatus may require analysis of a cause and adjustment of processing parameters used in the image processing. In this case, if the image data is recorded (logged) in the storage device, inspection is easily performed on content of the image processing. Specifically, logging of image data associated with the image processing is useful for analysis of a cause at a time of trouble and preventive maintenance, and furthermore, useful for evaluation and consideration of validity at a time of the adjustment of the processing parameters.

However, in recent years, data on an image captured by a digital still camera or the like has a large amount of information per data, and accordingly, a large storage capacity is required for storing image data. In a case where data on images associated with image processing are to be stored for a long period of time or data on a large number of images associated with image processing are to be stored, for example, a storage device having an enormous capacity is required, and therefore, cost of the storage device is increased. Furthermore, as an amount of image data transmitted to the storage device becomes large, a load of data communication is increased, and accordingly, a data communication speed may negatively affect a processing speed of a system.

To address this, a method for cutting out (extracting) only a partial region of image data and storing the partial region in a storage device so that an amount of image data to be stored in the storage device is reduced has been proposed (refer to Japanese Patent Laid-Open No. 2004-333446, for example). In Japanese Patent Laid-Open No. 2004-333446, a mounting position of an object to be subjected to image processing is fixed in advance and a region to be inspected is extracted and stored in a storage device. For example, in image processing in which a plurality of objects are simultaneously inspected, a range including the plurality of entire objects may be captured once. In particular, a configuration described in Japanese Patent Laid-Open No. 2004-333446 limits an inspection region required for the image processing in advance in such a case and causes the storage device to store only the region so that an amount of data to be stored is reduced.

In the configuration described in Japanese Patent Laid-Open No. 2004-333446, mounting positions of the objects are fixed in advance, and image data in regions determined in advance in accordance with the positions is stored in the storage device. Therefore, for an application in which a mounting position of an object may not be accurately set in advance, a large image region to be subjected to the image processing (and accordingly a large image region to be stored in the storage device) is set. In this case, a large storage region is required for logging image data. For example, although an object is sufficiently small relative to an entire captured image, the object may move in inspection and the movement may not be stopped. In this case, a large image region to be subjected to the image processing and the logging of the image data is required to be set, and accordingly, a region required for storing the image data is unnecessarily increased.

Furthermore, to reduce a region required for storing data, compressed image data may be stored in a storage device. For example, various image data compression methods including a lossy compression method using discrete cosine transform (such as JPEG) and a lossy compression method using wavelet transform or the like (such as JPEG2000) have been used. When such a lossy compression method is employed, a large compression rate is obtained depending on a setting of an image quality parameter, and accordingly, a region for the logging in the storage device may be considerably reduced. However, it is possible that throughput of a system is degraded due to an image compression process when a size of the image data is large or when the number of images corresponding to the image data to be processed is large.

Furthermore, in the lossy compression method described above, although a region required for storing the image data may be efficiently reduced, once the image data is compressed, the original image data before compression may not be reproduced from the compressed image data. Furthermore, even when the compressed image is displayed or printed out, luminance information and color information of pixels included in the image data before compression may not be reproduced. Accordingly, even when the image processing is performed on the image data compressed by the lossy compression method, it is not necessarily the case that a processing result obtained when the image processing is performed on the image data that has not been compressed is obtained.

Therefore, use of the compressed image is not appropriate for changing and considering parameters associated with target image processing. Even when image processing is similarly performed on the image data that has not been compressed and the image data that has been subjected to the lossy compression to obtain matching positions of pattern matching, positions where a contour is detected, and extraction areas of regions, and the like, it is highly likely that different processing results are obtained. Furthermore, although degradation of image quality may be suppressed by appropriately setting parameters of a compression process in a specific lossy compression method, if the image quality is prioritized, a desired effect of reduction of a data amount may not be obtained on the other hand. Although lossless compression methods that do not degrade image quality have been used, in general, a compression rate that is as appropriate as that of the lossy compression methods is not obtained when such a lossless compression method is used.

To address the issues described above, when image data to be subjected to image processing is to be extracted and stored, a dynamic determination of an extraction position of the image data in accordance with content of the image processing and reduction of an amount of data to be stored when the image data to be subjected to the image processing is stored are enabled. Even when a position of an object is changed every time image data is input, the image data may be stored in a smaller region while reproducibility of a result of the image processing is maintained.

SUMMARY

An aspect of the present invention provides an image processing method including performing image processing on input image data by a control device, determining, by the control device, an extraction region of an extraction image extracted from the input image data in accordance with content of the image processing performed on the input image data, and extracting, by the control device, the extraction image from the determined extraction region of the input image data and storing the extraction image as history data of the image processing.

Further features of the present disclosure will become apparent from the following description of exemplary embodiments with reference to the attached drawings.

According to the present disclosure, when image processing, such as an image recognition process, is performed and image data associated with the image processing is stored as history data, an extraction image extracted from an entire image is stored. Therefore, an amount of data to be stored in a storage unit, such as an external storage apparatus that stores history data, may be considerably reduced. Furthermore, since an image extraction region is determined in accordance with execution content of the image processing, a size of the extraction image required (or sufficient) for the execution of the image processing is ensured. Accordingly, verification and reproduction of the image processing or control of the image processing may be easily and reliably performed.

BRIEF DESCRIPTION OF THE DRAWINGS

FIG. 1A is a diagram illustrating entire image data to be subjected to image processing according to a first embodiment, FIGS. 1B to 1F are diagrams illustrating the image processing that performs extraction according to the first embodiment, and FIGS. 1G and 1H are diagrams illustrating extraction image data according to the first embodiment.

FIGS. 3A to 3D are diagrams illustrating an effect of reduction of a data amount according to the first embodiment, wherein FIGS. 3A and 3C are diagrams illustrating image data to be processed and FIGS. 3B and 3D are diagrams illustrating extraction image data.

FIG. 4A is a diagram illustrating entire image data to be subjected to image processing according to a second embodiment, FIGS. 4B to 4F are diagrams illustrating the image processing that performs extraction according to the second embodiment, and FIGS. 4G and 4H are diagrams illustrating extraction image data according to the second embodiment.

DESCRIPTION OF THE EMBODIMENTS

Embodiments will be described in detail hereinafter with reference to the accompanying drawings.

Figure 7:
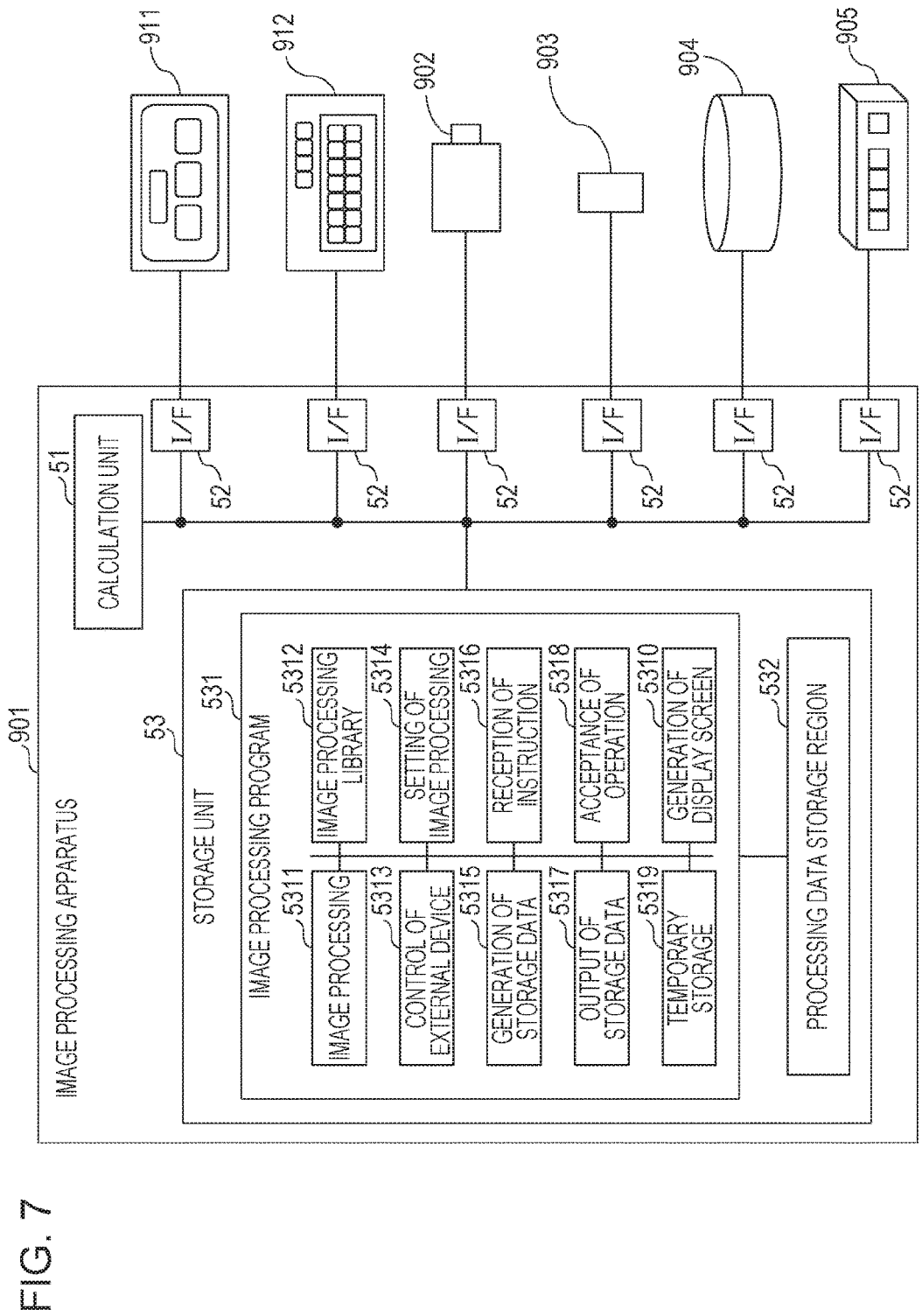
FIG. 7 is a block diagram illustrating a configuration of an image processing apparatus that employs an exemplary image processing method.

FIG. 7 is a diagram illustrating a configuration of an image processing apparatus 901 capable of performing image processing of the present disclosure. The image processing apparatus 901 of FIG. 7 includes a display device 911 constituted by a cathode ray tube or a liquid crystal panel that displays an image, and an operation input device 912 including a keyboard, a mouse, a touch panel, an input operation controller, and a gesture input device that is used to input various operations. The display device 911 and the operation input device 912 mainly serve as user interfaces.

The image processing apparatus 901 further includes an image pickup device 902, such as a digital still camera, serving as an image data input unit. The image pickup device 902 includes a lighting device 903, such as halogen lighting or light-emitting diode lighting.

Furthermore, an external storage apparatus 904 constituted by an external storage device, such as an HDD or an SSD, is connected to the image processing apparatus 901. The external storage apparatus 904 may be constituted by an external storage device disposed in a server connected through a network or the like (or a so-called "NAS device"). The external storage apparatus 904 is used stores or records (log) history data associated with image processing performed on input image data as described below in the exemplary embodiments. Extraction image data that is extracted by a processing procedure described below (and entire compressed input image data as described in the second embodiment) is recorded in the external storage apparatus 904 as history data associated with image processing performed on input image data.

Furthermore, an external controller 905 is connected to the image processing apparatus 901 through the network, a cable, or the like. The external controller 905 is constituted by a robot control apparatus in an example of FIG. 8, for example. The external controller 905 transmits a control instruction to the image processing apparatus 901 and receives a processing result from the image processing apparatus 901.

The units described above are connected to one another through interfaces 52 connected to an internal bus in the image processing apparatus 901. The interfaces 52 are configured in accordance with a standard that is appropriate to communicate with the various units described above. The interfaces 52 are constituted by a network interface, a USB (Universal Serial Bus) interface, and a serial communication interface, for example, depending on a connection target.

The image processing apparatus 901 includes a calculation unit 51 that includes a CPU (Central Processing Unit) element configured as a general microprocessor and a GPU (Graphics Processing Unit) element operating as an image processing processor and that serves as a control device that is a main device of the image processing. The calculation unit 51 is connected to a storage unit 53 illustrated on the left side in FIG. 7 through the internal bus (a data bus, an address bus, other control lines, and the like) in the image processing apparatus 901. The storage unit 53 includes a nonvolatile memory device, such as a ROM (Read Only Memory), a RAM (Random Access Memory), or an E(E)PROM, and a file region, a virtual storage region, and the like in an external storage apparatus (such as an HDD, an SSD, not illustrated, or the external storage apparatus 904).

A processing data storage region 532 included in the storage unit 53 is constituted by the RAM region included in the storage unit 53, the file region and the virtual storage region of the external storage apparatus 904, and the like. Processing data is temporarily stored in the processing data storage region 532, and in addition, setting parameters of the image processing and the like are stored in the processing data storage region 532. Furthermore, when image data is logged in the external storage apparatus 904, the processing data storage region 532 is used as a data cache of the external storage apparatus 904, for example.

Furthermore, an image processing program 531 for embodying the image processing of this embodiment is stored in the storage unit 53.

The image processing program 531 changes settings of the image processing and executes the image processing in response to various operations performed by the operation input device 912. Furthermore, content of the changing may be stored in the processing data storage region 532 and deleted from the processing data storage region 532.

The image processing program 531 includes software that realizes the following functions, for example. First, image processing 5311 is a body portion of the image processing program 531 that realizes the image processing described below. An image processing library 5312 is used by the image processing 5311. The image processing library 5312 is implemented in the storage unit 53 as a statically or dynamically linked library, for example. An image processing setting 5314 that determines an operation of the image processing program 531 is performed in response to various operations performed by the operation input device 912 or the like.

Furthermore, the image processing program 531 includes I/O (input/output) routines that realize the following functions. Specifically, the routines include control of external device 5313, generation of storage data 5315, reception of an instruction 5316 for the operation input device 912, temporary storage 5319 including the RAM region and the cache region of the calculation unit 51, and generation of a display screen 5310. The functions described above are implemented in the storage unit 53 as application (utility) programs and sub-routines configured as a statically or dynamically linked library.

The image processing apparatus 901 may execute the image processing program 531 so as to execute the image processing by controlling the image pickup device 902 and the lighting device 903, for example, and by using the calculation unit 51 of the image processing apparatus 901. Furthermore, the image processing apparatus 901 may accept a user's operation using the operation input device 912 and may receive an instruction issued by the external controller 905. In response to the operation or the instruction, the calculation unit 51 may call the functions of the image processing program 531 and the library, perform various calculation processes, and transmit a result of the image processing to the external controller 905. Furthermore, the image processing apparatus 901 may accumulate (log) the result of the image processing in the external storage apparatus 904. Here, an image cutting (extraction) process described below is performed. Furthermore, a screen configuration stored in a program in advance and the result of the image processing may be combined with each other as a screen to be displayed in the display device 911.

Figure 8:
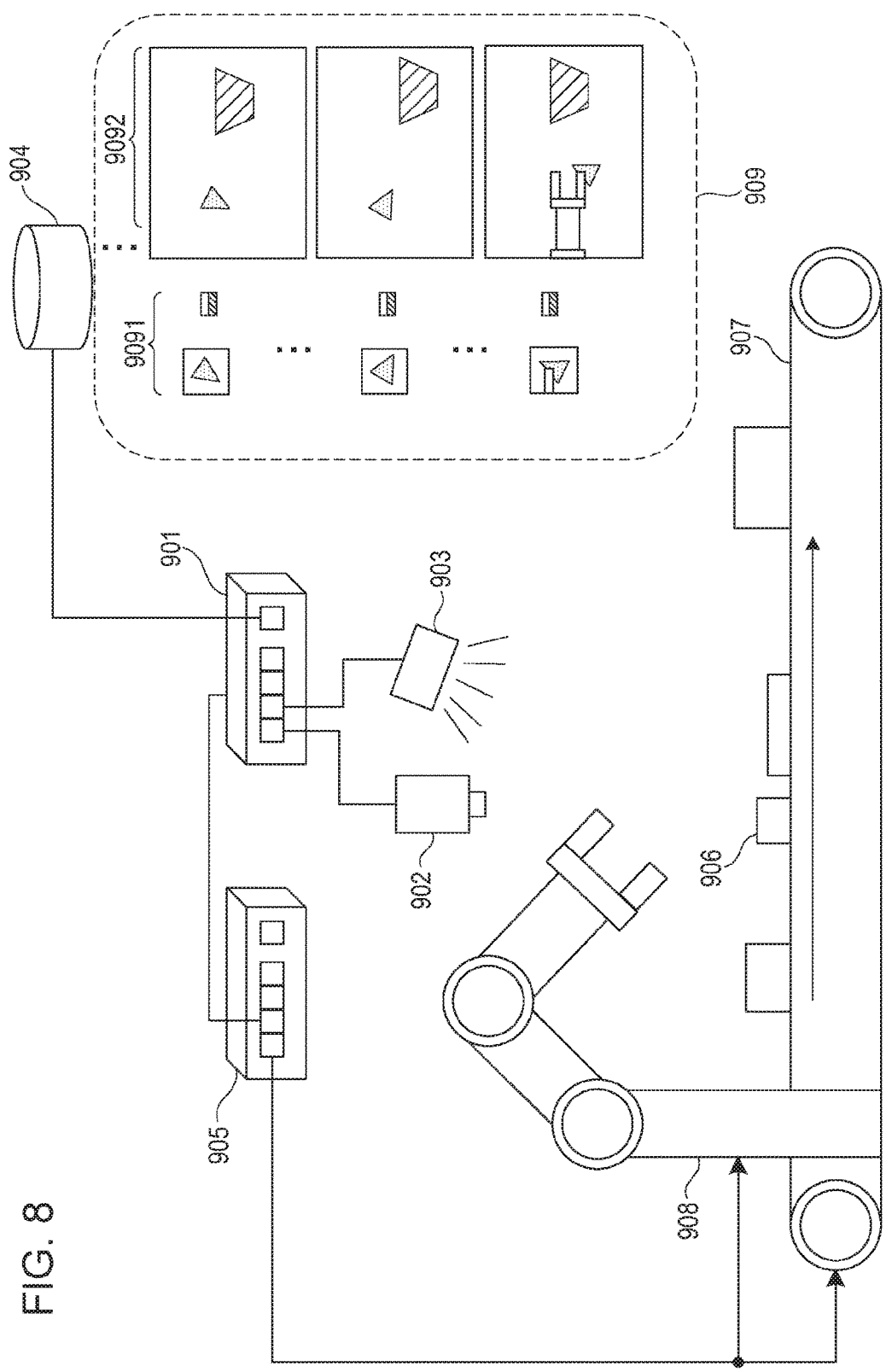
FIG. 8 is a diagram illustrating an entire configuration of a robot system in a case where the image processing apparatus of FIG. 7 is employed in a robot apparatus.

The image processing apparatus 901 illustrated in FIG. 7 and the blocks illustrated on the right side in FIG. 7 may be incorporated in a system illustrated in FIG. 8, for example, as an image processing unit of a vision system of an industrial robot. The display device 911 and the operation input device 912 are omitted in FIG. 8.

The robot system illustrated in FIG. 8 includes a conveying apparatus 907 that conveys an object (a work) 906 and a robot arm 908 that assembles, processes, and conveys the object 906. In the robot system illustrated in FIG. 8, the external controller 905 serves as a robot control apparatus that controls the robot arm 908 and an entire conveyance process performed by the conveying apparatus 907.

In FIG. 8, the external controller 905 is used to program content of operations to be executed by the robot arm 908. Furthermore, in an online operation of the robot arm 908, the external controller 905 controls a position and posture of the robot arm 908 in accordance with the content programed in advance and causes the robot arm 908 to perform a predetermined assembly, processing, conveyance, and the like on the object 906. The external controller 905 may transmit a measurement instruction to the image processing apparatus 901 and receive a processing result from the image processing apparatus 901. The external controller 905 further controls operation of the robot arm 908 that is operated in accordance with the result of the image processing performed by the image processing apparatus 901.

In such a robot system, the image processing apparatus 901 is utilized in so-called closed-loop control in the vision system. Specifically, the image processing apparatus 901 performs an image recognition process described below, for example, on an image captured by the image pickup device 902 so as to detect a position and posture of a specific portion of the robot arm 908 or a position and posture of the object 906, for example. Then the external controller 905 controls the operation of the robot arm 908 in accordance with the position and posture of the robot arm 908 or the object 906 detected through the image processing.

As described above, in the robot system, in a case where the image processing apparatus 901 is used to control the vision system, a specific operation of the robot arm 908 and a procedure and control parameters of the image processing of the image processing apparatus 901 that determine the specific operation of the robot arm 908 are preferably verified later. To enable the verification, image data (and association data, such as bibliographic data, associated with the image data) that has been processed by the image processing apparatus 901 is stored (logged) in the external storage apparatus 904 as history data 909.

In this embodiment, the history data 909 logged in the external storage apparatus 904 every time the image processing is performed by the image processing apparatus 901 at least includes an extraction image 9091 that is cut out (extracted) by an extraction process described below from image data that has been subjected to the image processing performed by the image processing apparatus 901. The extraction image 9091 corresponds to digital image data having uncompressed concentration and an uncompressed luminance value.

Furthermore, in a second embodiment described below, history data 909 logged in an external storage apparatus 904 is associated with an extraction image 9091, and in addition, includes a compressed image 9092 obtained by compressing entire image data that has been subjected to the image processing performed by the image processing apparatus 901. The compressed image 9092 is compressed by a lossy compression method, for example, that realizes a high compression rate.

As described below, a position and a size of the extraction image 9091 are determined in accordance with a predetermined object and content of the image processing performed for detecting the position and posture of the robot arm 908 or the object 906, for example. By this, (only) an image having a position and a size that is necessary and sufficient for verifying the image processing (or a robot operation controlled by the image processing) later may be logged.

Hereinafter, the image processing performed with the configuration described above, in particular, the extraction process performed by the extraction image 9091 that is logged as the history data 909 in the external storage apparatus 904 every time image processing is performed by the image processing apparatus 901 will be described with reference to FIGS. 1 to 6.

Figure 2:
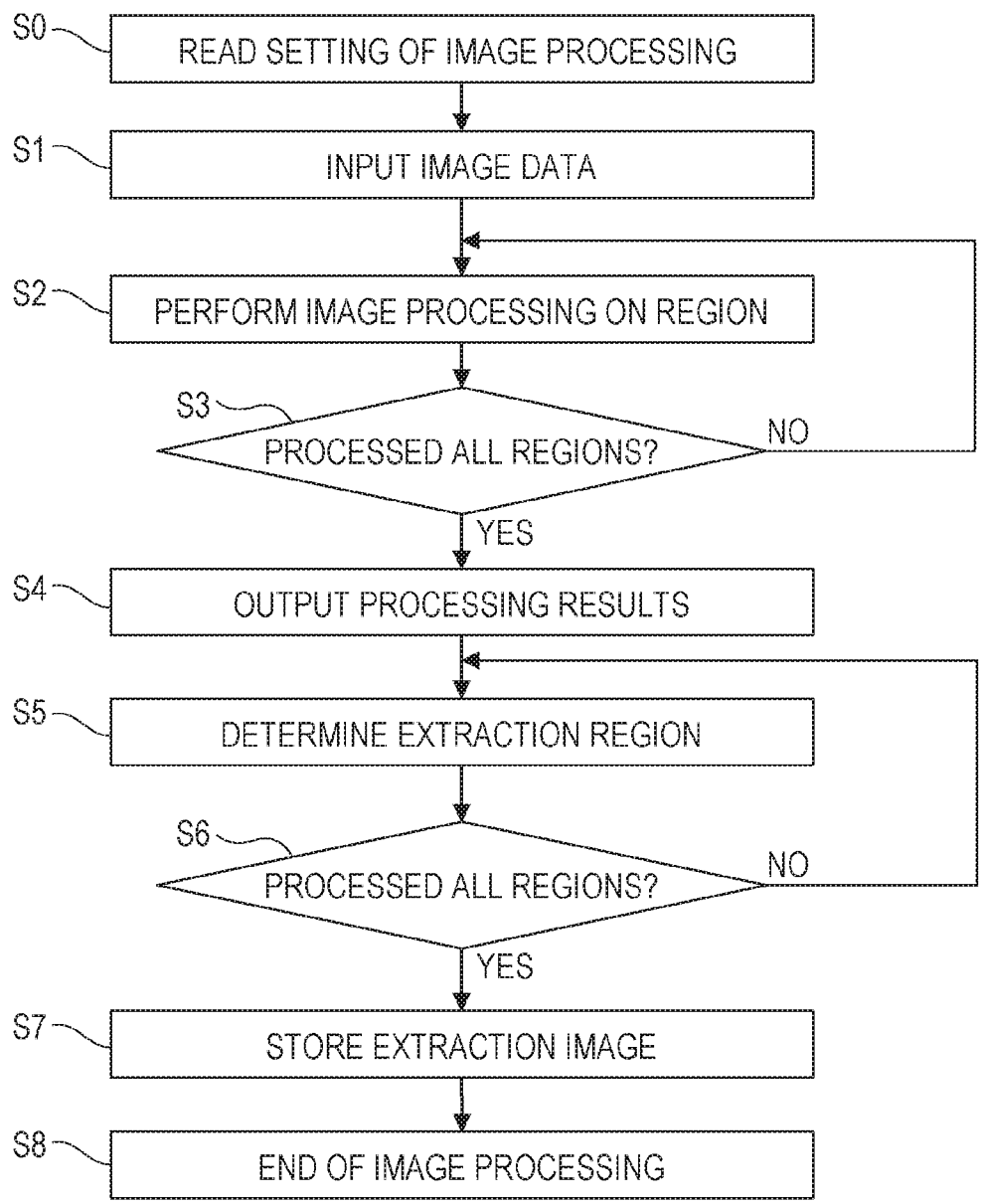
FIG. 2 is a flowchart illustrating an image data extraction region determination process according to the first embodiment.

FIGS. 1A to 1H are diagrams illustrating entire input image data and image data extracted in an extraction image data storage process. FIG. 2 is a flowchart illustrating an extraction region determination process performed on the basis of content of the image processing. Note that, to illuminate understanding, limited concrete examples of a region of the image processing, processing content, and a processing result are described hereinafter. However, a position, a size, a shape of a region to be subjected to the image processing, processing content, parameters used in the processing, and the like are preferably dynamically determined by providing a setting screen that allows a user to arbitrary set these items or by using another image processing algorithm.

In FIG. 1, a reference numeral 101 represents entire image data that is captured by the image pickup device 902 and that is to be subjected to the image processing performed by the image processing apparatus 901, and reference numerals 102 and 103 are processing regions to be subjected to the image processing. Reference numerals 104 and 105 are captured objects in the entire image data 101. Sizes and ranges of the processing regions 102 and 103 are individually set in accordance with sizes, estimated movement ranges, inspection target portions, and the like of the objects to be subjected to the image processing. The processing regions 102 and 103 may be set by a setting operation performed using the display device 911 and the operation input device 912, an image recognition processing method described below, or the like.

The objects 104 and 105 correspond to the object (the work) 906 in the robot system illustrated in FIG. 8 or a specific portion of the object 906, for example. A purpose of the image processing performed by the image processing apparatus 901 is to detect positions, postures (phases), sizes, and the like of the objects 104 and 105 in the entire image data 101.

To achieve the purpose, the image processing apparatus 901 performs image recognition processes as illustrated in FIGS. 1C to 1F as the image processing (the image processing 5311 of FIG. 7). The image recognition process in FIGS. 1C and 1E is different from the image recognition process in FIGS. 1D and 1F. One of the image recognition process methods to be employed is determined by a setting operation performed through the display device 911 and the operation input device 912, for example.

FIG. 1C is a diagram illustrating a search pattern 106 used in the image recognition process employing pattern matching (pattern recognition). FIG. 1D is a diagram illustrating a contour detection filter 107 used in the image recognition process employing contour detection. Here, a case where the image recognition process employing the pattern matching is performed on the object 104 illustrated in FIG. 1A and the image recognition process employing the contour detection is performed on the object 105 illustrated in FIG. 1A will be described as an example.

In FIG. 1C, the search pattern 106 is used to search for the same luminance distribution and the same shape. In the pattern matching, image processing of searching for a position of image data similar to the search pattern 106 in a range of the processing region 102 illustrated in FIG. 1A is performed. Note that, when the pattern matching is performed, a search pattern is compared with image data, and accordingly, certain preprocessing, such as a normalizing process, a smoothing process, or a contour detection process, is performed where appropriate. Therefore, when the search pattern 106 is generated in advance, regions required for the preprocessing are added to the search pattern 106 in horizontal and vertical directions, and thereafter, a size Px of the search pattern 106 in the horizontal direction and a size Py of the search pattern 106 in the vertical direction are calculated and stored. The regions required for the preprocessing are added as correction values when the search pattern 106 is read in an initial setting of the image processing and are temporarily stored.

In the pattern matching, a process of successively comparing the search pattern 106 with images in specific positions in the range of the processing region 102 using a region, such as the temporary storage 5319 of the storage unit 53 (FIG. 7), so that it is determined whether the search pattern 106 coincides with (or is similar to) one of the images in the specific positions is performed. Furthermore, in this case, it is determined whether the pattern matching is attained while the search pattern 106 is successively rotated by a small amount as illustrated in FIG. 1E every time the comparison is performed. Sizes of regions required for the rotation, that is, a size Px' in the horizontal direction and a size Py' in the vertical direction are naturally larger than the sizes Px and Py of the search pattern 106 of FIG. 1C obtained before the rotation. For example, the regions required for the rotation are also added as correction values in advance and temporarily stored.

In the case of the object 104 of FIG. 1A, in the pattern matching described above, when the search pattern 106 is rotated by a certain degree and compared with a pattern of an image of the object 104, the patterns coincide with each other as represented by a reference numeral 113 of FIG. 1G and image recognition is attained.

On the other hand, in the contour detection, the contour detection filter 107 illustrated in FIG. 1D is used. The contour detection filter 107 is used to calculate and detect a degree of change of the luminance distribution, for example. In the contour detection filter 107, a process of detecting a point having a large luminance gradient or a group of points having a large luminance gradient is performed, for example. Note that, although the processing region 103 for the contour detection is smaller than the object 105 having a substantially trapezoidal shape in the example of FIG. 1D, such contour detection is performed when detection of only a direction or a position of a specific edge (side) of the object 105 is sufficiently performed.

In a case of the contour detection filter 107 illustrated in FIG. 1D, a luminance determination is successively performed in a filter region (having a size Fx in the horizontal direction and a size Fy in the vertical direction) in a direction indicated by arrow marks of FIG. 1D so as to detect a group of points having a largest luminance gradient as a contour. Furthermore, when such contour detection is performed, certain preprocessing, such as a normalizing process or a smoothing process of the luminance distribution or a contour emphasizing process, is performed as processing performed before the luminance gradient is detected. Then a processing region required for the preprocessing is ensured (in the temporary storage 5319, for example) in the storage unit 53 as a region that stores the contour detection filter 107. For example, when the contour detection filter 107 is generated in accordance with content of a setting, regions required for the preprocessing is added to the size Fx in the horizontal direction and the size Fy in the vertical direction of the contour detection filter 107. Then the obtained size Fx' in the horizontal direction and the obtained size Fy' in the vertical direction (FIG. 1F) are calculated and are ensured as a region for the contour detection filter 107.

By performing the contour detection described above with reference to FIGS. 1D and 1F, in the case of the object 105 illustrated in FIG. 1A, a contour 114 of an edge (a side) of the object 105 of the image is recognized as an image as illustrated in FIG. 1H.

Furthermore, in FIG. 1B, the whole picture of a result of the execution of the image processing described above performed on the entire image data 101 is denoted by a reference numeral 108. In FIG. 1B, a reference numeral 109 denotes a result of the execution of the pattern matching detected using the search pattern 106 (a result of detection of an image pattern that is the most similar to the search pattern 106 in an example of FIG. 1B), and a reference numeral 110 denotes a result of the detection of a contour using the contour detection filter 107.

In this embodiment, the image processing apparatus 901 performs the image recognition process described above as the image processing and logs the history data 909 of the image processing in the external storage apparatus 904. In this case, only a region including a target portion recognized by the image recognition processing is stored as an extraction image (9091 of FIG. 8). Reference numerals 111 and 112 of FIG. 1B denote extraction regions of extraction images that are logged in the external storage apparatus 904 in a case where the image recognition processes described above are performed.

As results of the image recognition processes, sizes of the extraction regions 111 and 112 that are extracted such that the extraction regions 111 and 112 include the recognized images are determined in accordance with content of the executions of the image recognition processes, such as a pattern detection position of the pattern matching and a contour detection position. For example, the size of the extraction region 111 is determined in accordance with the size, the rotation range, and the like of the search pattern 106. For example, as illustrated in FIG. 1C, the search pattern 106 used in the pattern matching has a rectangular shape having the size Px in the horizontal direction and the size Py in the vertical direction. The rectangular region is used in the matching while being rotated as described above. In the case of the image recognition process described above, a search rotation range of the search pattern 106 is determined as the extraction region 111. Assuming that the search rotation range of the search pattern 106 is a range from 0 degree to 360 degrees, the size Px' in the horizontal direction of the extraction region 111 and the size Py' in the vertical direction of the extraction region 111 correspond to a length of a diagonal line of the search pattern 106 as illustrated in FIG. 1E.

If the size of the extraction region 111 is determined and recorded in the external storage apparatus 904 without compression, for example, as the extraction image 9091 (FIG. 8), content of the image processing may be reliably and easily verified later without storing the entire image data 101. Specifically, if the extraction region 111 having a size corresponding to the search rotation range of the search pattern 106 is extracted and recorded in the external storage apparatus 904, an issue with a rotation range for searching being insufficient does not arise even when the pattern matching is performed again for verification performed later.

Note that the extraction region 111 has the minimum size that allows the search pattern 106 to rotate by 360 degrees. However, in a case where a rotation range is limited in the pattern matching, the largest values of the sizes Px' and Py' in the rotation range of the search pattern 106 may be employed on the basis of the consideration described above. For example, in a case of pattern matching in which rotation is not performed, the size Px' may be equal to the size Px and the size Py' may be equal to the size Py. Furthermore, in a case of matching including scale change, the sizes Px' and Py' may be obtained by multiplying the sizes Px and Py by the maximum value of an enlargement factor. Furthermore, a surplus region of an extraction region is to be ensured, a function of arbitrarily setting a value of the surplus region may be provided and the value may be added to the sizes Px' and Py' or the obtained sizes Px' and Py' may be multiplied by a certain coefficient. Furthermore, for a plurality of detection results that satisfy a certain standard or a certain condition, a region that includes positions of the detections may be determined as an extraction region or different extraction image regions may be generated for different detection positions.

Furthermore, when the extraction region 111 is stored in the external storage apparatus 904 as the extraction image 9091, the extraction region 111 may be stored in an uncompressed state or may be stored by a lossless compression method. In this case, as the lossless compression method, various lossless compression methods employed in a TIFF format, for example, may be used. Although a compression rate is not so large in the lossless compression method, a compression process may be performed at high speed with low calculation cost on the extraction region 111 having the illustrated size. Furthermore, when compared with compression of the entire image data 101, an amount of data to be stored in the external storage apparatus 904 may be considerably reduced and a load of the compression process is decisively small.

Similarly, in the case where the contour detection is performed as the image recognition process, a size of the extraction region 112 is determined in accordance with content of the image recognition process. The size of the extraction region 112 illustrated in FIGS. 1B and 1F is determined in accordance with a size of the contour detection filter 107. It is assumed that, when a filter that detects a contour in the vertical direction is used, for example, a size in the horizontal direction of the contour detection filter is denoted by "Fx", a size in the vertical direction of the contour detection filter is denoted by "Fy", and a contour detection direction corresponds to a vertically lower direction of an image (a direction denoted by arrow marks in FIG. 1D). In this case, the horizontal direction size Fx' of the extraction region 112 and the vertical direction size Fy' of the extraction region 112 are obtained by the following expressions: Fx'=Fx, Fy'=Fy.

As with the case of the pattern matching, in the case of the contour detection filter, when a rotation range is set, sizes Fx' and Fy', which are the largest values in the rotation range, are obtained. Furthermore, in a case where a detection filter in which contour information items are not connected to one another but scattered is used, a method for determining a region by adding horizontal and vertical sizes of the used filter to a region including a detected group of points may be employed. Furthermore, a surplus region of the extraction region 112 may be arbitrarily set in accordance with a setting operation performed through the display device 911 and the operation input device 912. For example, a value input by the setting operation may be added to the sizes Fx' and Fy' or the obtained sizes Fx' and Fy' may be multiplied by a certain coefficient.

As described above, when the extraction region 112 having a size corresponding to the region required for the image recognition process using the contour detection filter 107 is extracted and recorded in the external storage apparatus 904, an issue with a rotation range for searching being insufficient does not arise even when the contour detection is performed again for verification performed later. Also in the case of the contour detection, an image in the extraction region 112 may be compressed by the lossless compression method and recorded in the external storage apparatus 904.

As described above, in this embodiment, when an image associated with an image recognition process is to be stored in the external storage apparatus 904 as history data, an extraction region is determined in accordance with content of the image recognition process. By this, the extraction region including the image associated with the image recognition process may be determined, verification to be performed later may be reliably and appropriately performed, and an amount of data required to be stored in the external storage apparatus 904 may be considerably reduced when compared with a case where the entire image data 101 (108) is stored.

Note that, although the method for determining the extraction regions 111 and 112 as rectangular regions having axes of an image coordinate system in horizontal and vertical directions that are the same as those of the captured image is illustrated, the shapes of the extraction regions 111 and 112 may be circle, oval, polygon, or the like. Furthermore, a function of setting shapes and sizes of the extraction regions 111 and 112 using the user interfaces of the display device 911 and the operation input device 912 may be provided. Furthermore, a function of selecting shapes that make amounts of data of the extraction regions 111 and 112 minimum in accordance with a certain condition may be provided.

Here, referring to FIG. 2, a procedure of a process of determining an extraction region of image data in accordance with content of execution of image processing will be described. Here, input image data, content of the image processing, a result of generation of extraction image data generated in accordance with a result of the image processing, and the like are the same as those of FIG. 1 unless otherwise noted. A control procedure of FIG. 2 is implemented as the image processing program (531 of FIG. 7). In particular, the control procedure is implemented as modules, such as the image processing (5311) and the image processing library (5312) of FIG. 7. The image processing program may be stored as a computer readable program in a storage device constituting the storage unit 53, a semiconductor memory, such as a ROM or an E(E)PROM, or an external storage device, such as an HDD or an SSD. Furthermore, when the storage unit 53 is constituted by a removable storage device, such as an HDD, an SSD, or various flash memories, these devices may be used when the image processing program of the image processing apparatus 901 is installed and updated.

In step S0 of FIG. 2, setting information of the image processing is read. For example, a setting of the image processing (5311 of FIG. 7) stored in the ROM region of the storage unit 53 or the region of the external storage device is read to a region of the temporary storage (5319) or the like. Alternatively, in this stage, the setting information of the image processing may be set or partially changed using the user interfaces of the display device 911 and the operation input device 912. Setting data of the image processing (5311) includes the number of regions to be subjected to the image processing, positions, sizes, and shapes of the processing regions, a type of an image processing method, such as the pattern matching or the contour detection, numerical value parameters used in the processing, and the like.

In the case of the image processing described with reference to FIG. 1, the number of regions to be subjected to the image processing described in the setting data is 2. In the processing region 102, the pattern matching is performed using the search pattern 106. In the processing region 103, the contour detection is performed using the contour detection filter 107. Note that processing parameters of the pattern matching include an allowable value of a matching rate, the number of detected patterns, and the like in addition to a search pattern and a search range, and processing parameters of the contour detection include a type of an operator, an amplification rate, and the like, in addition to a filter size and a detection direction. Arbitrary constants that are individually set are used as the processing parameters provided that the processing parameters do not affect extraction ranges of image data or the processing parameters are added to the sizes of the processing regions in advance.

Subsequently, in step S1, the entire image data 101 to be subjected to the image processing is input. Here, the image data to be subjected to the image processing may be read from the image pickup device 902 or may be captured and stored in the external storage apparatus 904 in advance.

In step S2, the image processing is executed on the processing regions (102 and 103) included in the entire image data 101. In the example of FIG. 1, when the image processing is performed on the processing region 102, the pattern matching is performed using the search pattern 106 and a matching result (109) is obtained. When the image processing is performed on the processing region 103, the contour detection process is performed using the contour detection filter 107 and a contour detection result (110) is obtained.

In step S3, it is determined whether all the image regions included in the entire image data 101 have been processed. When the determination is negative, the process returns to step S2 where the image processing is performed again, whereas when the determination is affirmative, the process proceeds to step S4. Note that, when a plurality of calculations for the image processing may be performed in parallel by a calculation unit (51 of FIG. 7) in terms of hardware or software, the process in step S2 may be executed by a plurality of processes or a plurality of threads simultaneously.

In step S4, a result of the image processing is temporarily stored and output. The result of the image processing may be displayed in a screen or the like in an image format as denoted by the reference numeral 108 of FIG. 1 using the display device 911 or may be transmitted to another system through a network. Output information that is output here includes screen information including a matching result (109) or a contour detection result (110), information on a coordinate of a matching position of an original pattern, information on a rotation angle, a matching rate, information on a position of a group of points of the contour detection, and gradient information. Furthermore, information on a center of gravity, information on presence and absence, determination information, and the like, which are based on the information described above, may be additionally output. An output format of the information described above may be a numerical value, an image, such as a graph or a diagram, audio output through an audio reproducing apparatus, not illustrated, if necessary, or the like.

In step S5, the image extraction process described with reference to FIG. 1 is performed. Here, as described above, an extraction region is determined in accordance with content of the execution of the image recognition process performed on the processing region 102 or the processing region 103. For example, in a case of the processing region 102, the extraction region 111 that is determined in advance is positioned in accordance with an execution result 109 of the pattern matching, that is, a matching position so that the extraction region of image data is determined in the entire image. Furthermore, in a case of the processing region 103, the extraction region 112 that is determined in advance is positioned in accordance with a contour detection result 110, that is, a contour detection position so that the extraction region of image data is determined in the entire image. In the example of FIG. 1, a rectangular region is extracted. In this case, the horizontal size Px' and the vertical size Py' of the extraction region 111 or the horizontal size Fx' and the vertical size Fy' of the extraction region 112 are determined as described above.

In step S6, it is determined whether the process of determining an extraction region has been performed on all the processing regions. When the determination is affirmative in step S6, the process proceeds to step S7, whereas when the determination is negative, the process returns to step S5 where a processing target region is changed and the extraction process is performed again. Here, the process in step S5 may be executed by a plurality of processes or a plurality of threads simultaneously if possible in terms of hardware or software.

In step S7, extraction image data (113 or 114 of FIG. 1 or 9091 of FIG. 8) of the extraction region determined in step S5 is generated from the entire image data 101 and is stored in the external storage apparatus 904. In step S7, as described above, the extraction images may be stored as uncompressed image data (in a BMP format, for example) or data in a lossless format.

For example, in a case where an extraction image has a small size, an amount of data in an uncompressed format and an amount of data in a lossless compression format may be only slightly different from each other or an amount of data in the lossless format may be conversely larger depending on circumstances. Therefore, in step S7, when the extraction image is to be stored, a smaller amount of data is determined from among the amount of data in the uncompressed format and the amount of data in the lossless compression format so that a format that is advantageous for reducing an amount of data to be stored is selected. The determination may be performed by comparing the amounts with each other after the lossless compression is actually performed, for example. Furthermore, in a compression format, a header portion of a file generally includes overhead, and accordingly, a desired compression efficient may not be obtained in a case of a considerably small amount of original data. Taking such a condition into consideration, the uncompressed format may be selected in a case of an extraction image in which an amount of image data thereof is smaller than a certain amount.

Furthermore, in step S7, in addition to the extraction images, data including supplemental information, such as coordinates of starting points of the extraction images, sizes, shapes, data formats, and file names of the extraction images, may be stored. Furthermore, content of the image processing executed in the processing regions, execution results, and used processing parameters may be additionally stored.

In step S8, the image processing is terminated. Here, the image processing may be terminated after the temporary storage region that is no longer used is released or an instruction for performing the image processing may be waited again while reusable data is maintained.

As described above, according to this embodiment, when the image processing apparatus 901 performs the image processing, such as an image recognition process, and stores image data associated with the image processing as history data, an extraction image extracted from an entire image is stored. Therefore, an amount of data to be stored in a storage unit, such as an external storage apparatus that stores history data, may be considerably reduced.

Furthermore, an extraction region of an image is determined in accordance with content of execution of the image processing. For example, the extraction region includes an image region in which the image recognition process, such as the pattern matching or the contour detection, has been successfully performed and a desired pattern or a desired contour has been recognized. Furthermore, the extraction region is determined to have a size required for (or sufficient for) executing the image recognition process, such as the pattern matching or the contour detection (or executing verification and reproduction performed later).

Furthermore, since extraction image data is stored as history data in an uncompressed format or a lossless compression format, logging associated with the image processing may be performed while reproducibility of the image processing is maintained. Moreover, since the extraction region in the image is determined in accordance with content of execution of the image processing, verification to be performed later may be reliably and appropriately performed.

According to this embodiment, the extraction region stored as history data may be dynamically determined every time the image processing is performed in an appropriate position and in an appropriate size. In particular, even in a case where a processing region having a margin is required to be set since a movement range of an object is large, such as a case where a position and a posture of the object are detected by the image processing in a robot system, an amount of history data to be stored may be sufficiently reduced.

Figure 3A:
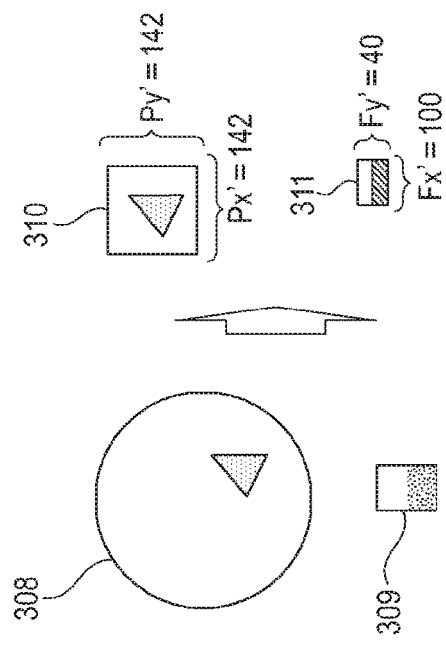

Here, the effect of the reduction of an amount of data to be stored according to this embodiment will be described in detail with reference to FIGS. 3A to 3D. In FIG. 3A, it is assumed that input image data 301 has an entire image size of 1024 pixels in a horizontal direction and 768 pixels in a vertical direction. Furthermore, it is assumed that an image processing region 302 has a radius of approximately 200 pixels, and an object 304 freely moves in the image processing region 302 as indicated by an operation locus 320. It is further assumed that an image processing region 305 includes 100 pixels in the horizontal direction and 200 pixels in the vertical direction, a portion of a contour of an object 306 freely moves in the vertical direction as indicated by an operation locus 307.

Figure 3C:
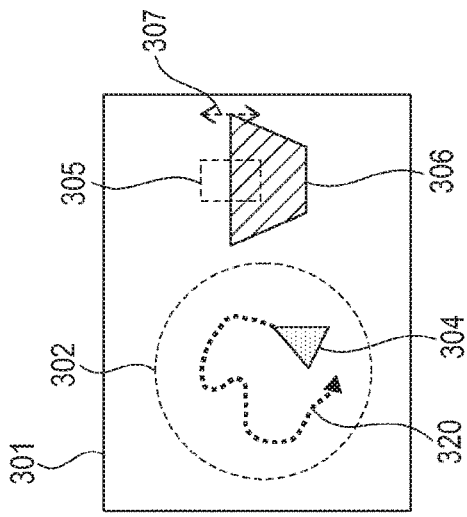
Figure 3B:
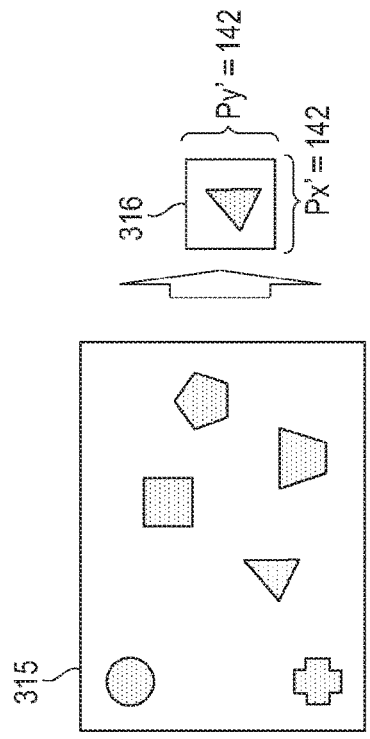

Furthermore, it is assumed that, as illustrated in FIG. 3B, a size of an extraction region 310 (113 of FIG. 1) that is extracted in an image recognition process corresponding to the pattern matching process described with reference to FIG. 1 has been obtained and is 142 pixels in the horizontal direction (Px') and 142 pixels in the vertical direction (Py'). Similarly, it is assumed that a size of an extraction region 309 (114 of FIG. 1) extracted in an image recognition process corresponding to the contour detection process has been obtained and is 100 pixels in the horizontal direction (Fx') and 40 pixels in the vertical direction (Fy').

Here, in a case where a general method for storing the entire input image data 301 is employed, a sum of pixels of image data to be stored as history data is 786432 (=1024*768). On the other hand, a sum of pixels included in the extraction region 309 and the extraction region 310 according to this embodiment is 24164 (=(100*40)+(142*142)), and accordingly, 90% of an amount of data to be stored may be reduced.

Figure 3D:
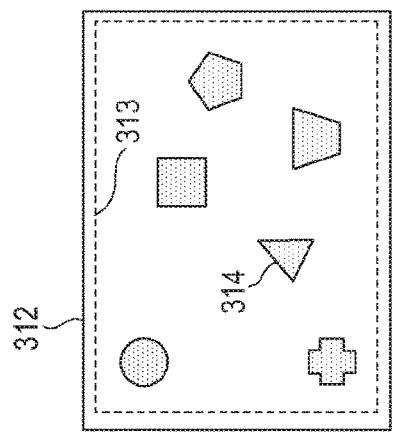

FIG. 3C is a diagram illustrating another input image data 312. In the example of FIG. 3C, an object 314 is detected in a large processing region 313. In the processing region 313, the object 314 that has a shape the same as that of the object 304 and that is recognized as an image by the pattern matching and a large number of other objects having different shapes are captured. It is assumed that an image size of the input image data 312 illustrated in FIG. 3C is the same as the input image data 301 of FIG. 3A, that is, the input image data 312 has 1024 pixels in the horizontal direction and 768 pixels in the vertical direction, and the processing region 313 includes 900 pixels in the horizontal direction and 600 pixels in the vertical direction, for example. Furthermore, a size of an extraction region 316 in the matching process is the same as that of the extraction region 310, that is, the extraction region 316 includes 142 pixels in the horizontal direction and 142 pixels in the vertical direction (FIG. 3D). Here, the number of pixels of an extraction image in the related art is 540000 (=900*600), whereas the number of pixels of the extraction image according to this embodiment is 20164 (=142*142). Accordingly, 95% or more of an amount of data to be stored may be reduced.

As described above, according to this embodiment, an effect of reduction of an amount of data to be stored is considerably large when compared with the case of the general method for extracting image data in an image processing region that is fixed in advance and storing the image data, for example. That is, an amount of image data corresponding to the larger number of times in which image processing is executed may be stored in a storage unit, such as an external storage apparatus used for logging of the image processing. Furthermore, in this embodiment, an extraction region of an image is determined in accordance with content of execution of image processing. Accordingly, reproducibility of the image processing is ensured, and when change or verification of image processing parameter is performed, an extraction image that is logged as image data for verification may be used.

Furthermore, according to the image processing of this embodiment, also in a case where image data is required to be transmitted in real time or the like, an amount of image data to be processed, transmitted, and stored by one image processing may be reduced. By this, an amount of image data transmitted through an interface, a bus, or a network may be reduced, processing loads of various processes, transmission, and storage may be reduced, and a data transmission time may be reduced.

According to this embodiment, even in a case where a position of an object to be subjected to the image processing is difficult to be specified, an extraction region of image data to be stored as history data may be dynamically determined every time the image processing is performed in accordance with content of the image processing irrespective of a region to be subjected to the image processing. Accordingly, an amount of image data to be stored as history data may be considerably reduced while reproducibility of the image processing is ensured. By this, even in image processing apparatuses having an equivalent storage region, image data of a larger number of images may be stored as history data while reproducibility of image processing is ensured. Furthermore, even when change or verification of the parameters of the image processing is required, processing parameters of higher validity may be determined since a result of the image processing may be checked using image data of a larger number of images. Furthermore, an amount of image data to be stored as history data may be reduced for each image processing, a band width required for transmitting image data through a bus or a network may be reduced, and a transmission time may be reduced. Moreover, an adverse effect about a processing time and a communication time on an entire system may be reduced.

Second Embodiment

According to the first embodiment, when the image processing apparatus 901 performs the image processing, such as the image recognition processes and stores image data associated with the image processing as history data, only extraction images extracted from an entire image is stored. Specifically, in the example of FIG. 8, for example, only the extraction images 9091 associated with image processing are stored as history data in the external storage apparatus 904. On the other hand, in a second embodiment, entire image data, for example, associated with image processing is stored as compressed image 9092 serving as history data in an external storage apparatus 904 along with an extraction image 9091 every time image processing is performed.

Image processing according to this embodiment will be described hereinafter with reference to FIGS. 4A to 4H, FIG. 5, and FIG. 6. In this embodiment, an image data compression process for generating compressed image data by performing lossy compression on entire input image data and a compressed image data storage process for storing the compressed image data in the external storage apparatus 904 are performed in addition to the processes of the first embodiment. Portions other than the generation and the storage of lossy compression image data are basically the same as those of the first embodiment.

Figure 6:
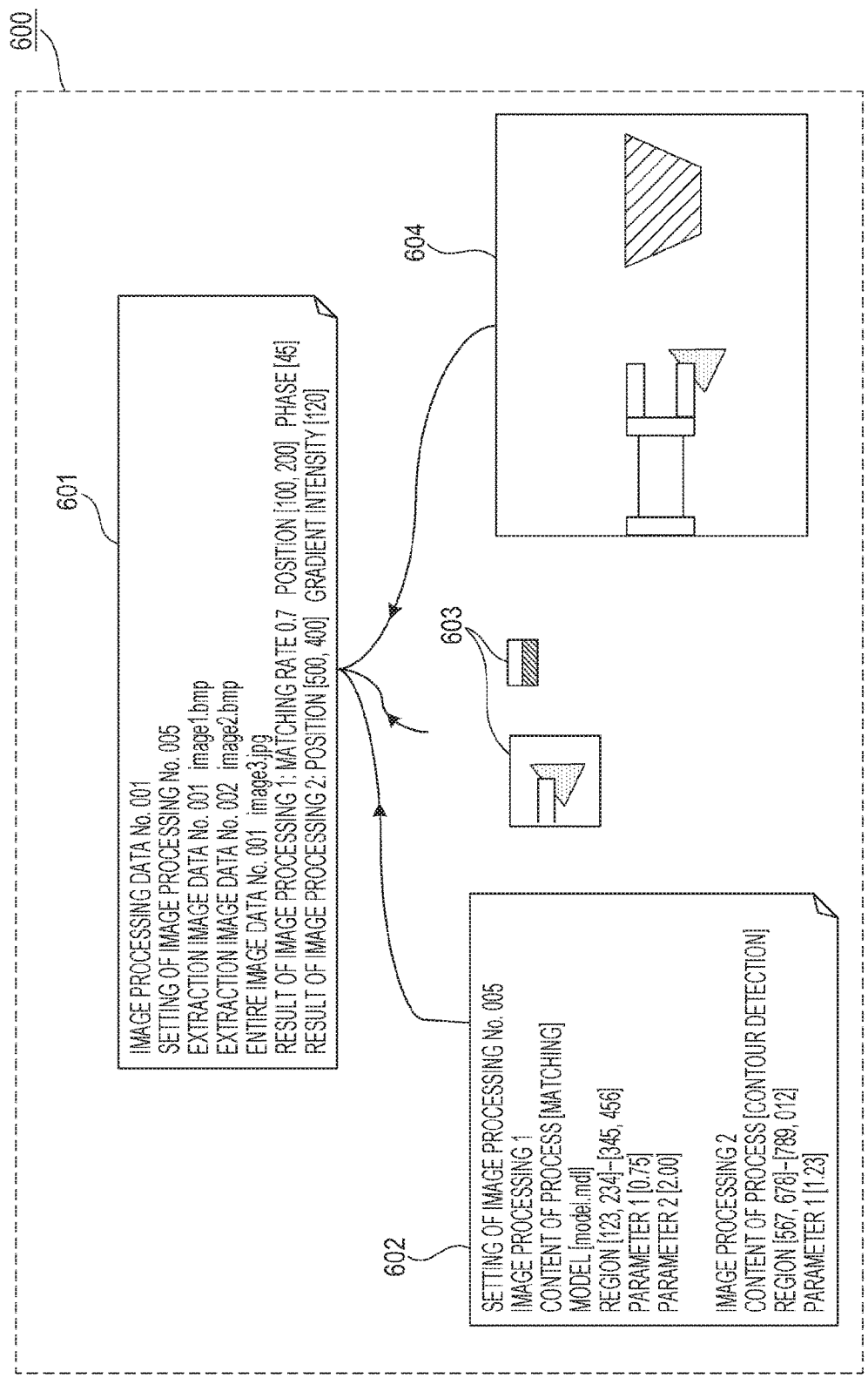
FIG. 6 is a diagram illustrating a data flow of an image data extraction process according to the second embodiment.

FIGS. 4A to 4H are diagrams illustrating entire image data 401 that is input and which is to be subjected to image processing. The entire image data 401 is captured in an imaging scene that is different from that of FIG. 1. FIG. 6 is a diagram illustrating a data flow of a set of image data generated and recorded in the image processing according to this embodiment.

Figure 5:
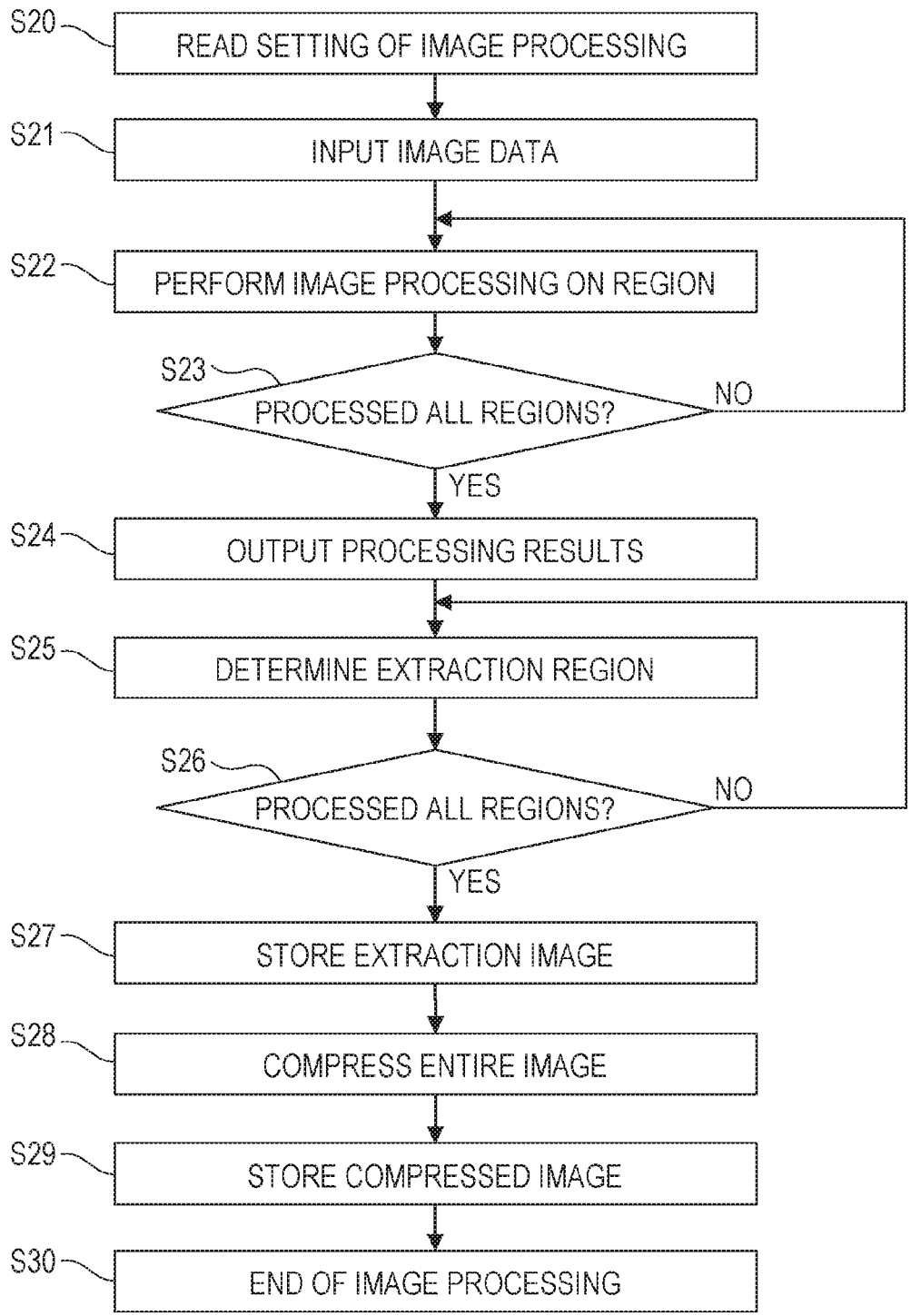
FIG. 5 is a flowchart illustrating an image data extraction region determination process according to the second embodiment.

FIG. 5 is a flowchart corresponding to the flowchart of FIG. 2 of the first embodiment. The flowchart of FIG. 5 includes a process of determining a region of an extraction image to be stored in the external storage apparatus 904 and a process of performing lossy compression on the entire image data 401. Step S20 to step S27 and step S30 in FIG. 5 are the same as step S0 to step S7 and step S8 in FIG. 2, and only processes in step S28 and step S29 corresponding to image compression and storage, respectively, which are performed after the process in step S27 are different from the first embodiment.

As image recognition processes, a pattern matching process (FIGS. 4C, 4E, and 4G) and a contour detection process (FIGS. 4D, 4F, and 4H) that are the same as those of FIG. 1 are performed.

In FIGS. 4A to 4H, components denoted by reference numerals 401 to 414 are the same as those denoted by the reference numerals 101 to 114 of FIG. 1. In the example of FIGS. 4A to 4H, a portion of content of image capturing of the entire image data 401 is different from that illustrated in FIG. 1. In FIG. 4A, sizes and positions of processing regions 402 and 403 of the image processing are the same as those of FIG. 1A. However, an obstacle 415 is captured in FIG. 4A. The obstacle 415 is the robot arm 908, for example, and in FIG. 4A, the obstacle 415 is superposed on an object 404 to be subjected to image recognition. An object 405 is captured in a format the same as that of FIG. 1A.

In FIG. 4B, an image processing result 409 represents that an image is partially lacked due to the presence of the obstacle 415 during the matching process. It is assumed that the matching process is successfully performed although a matching rate of a search pattern is lowered due to the presence of the obstacle 415. Therefore, extraction image data 413 (FIG. 4G), which is extracted in accordance with the image processing result 409, also includes the obstacle 415, and accordingly, the extraction image data 413 is different from the extraction image 113 of FIG. 1G.

The image processing, in particular, a determination of an extraction region in an image and an image compression process, is executed as illustrated in FIG. 5. A process from step S20 to step S27 in FIG. 5 is the same as the process from step S0 to step S7 in FIG. 2 of the first embodiment, and therefore, a description thereof is omitted. Image data input here, content of the image processing, a result of generation of extraction image data generated in accordance with a result of the image processing, and the like are the same as those of FIG. 1 unless otherwise noted.

In FIG. 5, after an extraction image is stored in step S27, the entire input image data 401 is subjected to lossy compression so that compressed image data (the compressed image 9092 described above) is generated in step S28. In this lossy compression process, a lossy image compression method using thinning of pixels, discrete cosine transform (a JPEG format, for example), wavelet transform (a JPEG2000 format, for example) or the like, may be employed. Furthermore, image data may be divided only in regions other than a region corresponding to an extraction image region so that divided image data corresponds to target data to be subjected to the lossy compression and to be stored. Furthermore, an amount of data to be stored may be further reduced by setting a region to be subjected to image compression to a region within an image processing region 402 or an image processing region 403 from the beginning.

In step S29, the compressed image 9092 generated in step S28 is stored in the external storage apparatus 904 as history data. Here, the extraction image 9091 and the compressed image 9092 are associated with each other as described later, and in addition, content including supplemental information, such as, a compression method and a compression rate, a file format, and a file name of the compressed image data may be stored as history data.

In step S30, the image processing is terminated. The image processing may be terminated after a temporary storage region that is no longer used may be released or an instruction for performing the image processing may be waited again while reusable data is maintained.

FIG. 6 is a diagram illustrating a data flow 600 of a set of recording data performed when the entire input image data 401 of FIG. 4A is input and history data of the image processing is logged in the external storage apparatus 904 in accordance with the processing steps of FIG. 5.

In FIG. 6, content of the image processing is described in image processing setting data 602. The image processing setting data 602 controls the image processing including the image recognition processes described above, and processing content of the pattern matching and processing content of the contour detection described above are described as "image processing 1" and "image processing 2". The image processing setting data 602 includes model identifying information for the pattern matching and control parameters as data for controlling the processing content. Extraction image data 603 corresponds to the extraction image data 413 and the extraction image data 414 of FIGS. 4G and 4H. Furthermore, compressed image data 604 is obtained by compressing the entire image data 401 of FIG. 4A, for example.

Image processing recording data 601 that is logged as history data of the image processing in the external storage apparatus 904 is generated from raw data of the image processing described above. The image processing recording data 601 includes information for specifying setting data used for the image processing, file names of the image data, results of the image processing, and the like, described therein.

In FIG. 6, the image processing recording data 601 is illustrated in a text format. As illustrated in FIG. 6, in the image processing recording data 601, the extraction image data 603 is recorded as bitmap files, such as files represented by "image1.bmp" and "image2.bmp". Note that it is not necessarily the case that the extraction image data 603 is stored in the image processing recording data 601, and the extraction image data 603 may be stored in the external storage apparatus 904 in a different file format. In this case, the image processing recording data 601 stores pointer information, such as file names or data addresses. Furthermore, the image processing recording data 601 may store bibliographic data for specifying (identifying) the image processing in addition to the results of the image processing associated with the extraction image data. The image processing recording data 601 is generated by generating a file that is a writing destination in advance in a temporary storage region (5319) or the like and adding content of each processing step. Thereafter, at a timing when the process in step S29 (FIG. 5) is terminated or the like, various information that is temporarily stored may be collected, formed in a predetermined format, and thereafter, stored in the external storage apparatus 904.

As described above, according to this embodiment, when image data associated with image processing of the image processing apparatus 901 is stored as history data, an extraction image that is extracted from an entire image is stored, and in addition, image data associated with the image processing or the entire image data is stored as a compressed image. Accordingly, the effect of the first embodiment is attained, and in addition, a smaller extraction range in image data may be dynamically determined in accordance with execution content of the image processing every time the image processing is performed, and furthermore, information for overviewing the entire image data may be simultaneously stored. Specifically, since the entire image data may be stored after being subjected to lossy compression in addition to an extraction image, overview information of the entire image data may be simultaneously stored while reproducibility of the image processing is ensured.

Note that, although a lossless compression method may be used as a compression method for compressing an entire image, for example, to be subjected to image processing, when a lossy compression method is used, image data having a large image region may be efficiently compressed.

It is assumed that, as with the case described above, the number of pixels in the horizontal direction is 1024 and the number of pixels in the vertical direction is 768 (a so-called "XGA size"), gradation of luminance is a monochrome format of 8 bits, and luminance data has linear luminance change gradated in the horizontal direction. When such entire image data is stored in an uncompressed state, a file size (a data amount) is approximately 800 KB according to a general uncompressed image file format. When the same image is subjected to the lossy compression using the discrete cosine transform (the JPEG format, for example) or the wavelet transform (the JPEG2000 format, for example), the image may be compressed to an image of a file size of approximately 200 KB to approximately 50 KB depending on a setting of an image quality parameter or the like. Accordingly, even when an entire image associated with the image processing is logged in addition to the extraction image, the entire image subjected to the image processing may be stored as an entire overview image, for example, without occupying a large region of capacity of a storage device. Even the discrete cosine transform method generally used in the JPEG2000 format does not cause large deterioration of image quality even in a case of a high compression rate (low image quality), and accordingly, the discrete cosine transform method may be applicable to the use of this embodiment.

Furthermore, according to this embodiment, since the entire image subjected to the image processing is stored, an operation of determining or verifying needs of change of parameters associated with the image processing may be facilitated. In particular, a situation and analysis in a case where an obstacle (415) is captured as illustrated in FIG. 4A may be quickly assessed and controlled when entire compression image data is additionally checked when compared with a case where only the extraction image data is used. For example, in a case where only the extraction image data 413 is logged as illustrated in FIG. 4G, it is likely that a portion of the obstacle 415 that is captured is not determined only using image data including the extraction image data 413. In this case, the portion may be immediately recognized by displaying a compressed image corresponding to compressed image data of the entire image in the display device 911. In addition, even in a case where an error occurs in the image processing (or robot control performed in accordance with the image processing in a case of a robot system), verification may be more flexibly performed. For example, a determination as to whether the error is to be corrected by controlling parameters of the image processing or an image processing setting is not required to be corrected but the correction is to be performed by another method since an unexpected system operation has occurred and the like are easily made.

Although two exemplary embodiments have been described above, these exemplary embodiments are not seen to be limiting, and additional exemplary embodiments may embody the above-described image processing technique in various image inspection apparatuses that perform image processing on an input image and which stores image data associated with the image processing. For example, an image inspection apparatus that performs an image recognition process on an image captured by an image pickup apparatus included in a vision system of a robot system and that detects a position and posture of a robot arm or an object as illustrated in FIG. 8. The image processing in the foregoing embodiments is executed by the calculation unit (51) of the image processing apparatus constituted by a CPU or a GPU. Accordingly, a recording medium that records a software program that realizes the functions described above may be supplied to an image inspection apparatus and the calculation unit (51) may read and execute the program stored in the recording medium. In this case, the program itself read from the recording medium realizes the functions of the foregoing embodiments.

Furthermore, although a computer readable recording medium corresponds to the storage unit 53 or a storage device included in the storage unit 53 in the foregoing embodiments, any computer readable storage medium is applicable. For example, an arbitrary external storage device including a removable HDD, a removable SSD, an optical disc, or various types of flash memory device may be used. If such a storage device stores the above-described program, the storage device is included in the computer readable recording medium according to the above-described embodiments.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:
1. An article production apparatus, comprising:
a conveying apparatus configured to convey at least one object;
an imaging apparatus configured to capture image data of the object; and
a robot configured to perform processing operation or assembly operation on the conveyed object to produce an article;
a robot controller configured to control the operation of the robot;
an image processing apparatus configured to perform image recognition process on the captured image data and store image data extracted from the captured image data into a storage device, the image processing apparatus including,
a control device capable of extracting image data from a plurality of extraction regions of the captured image data;
wherein the plurality of extraction regions is determined in accordance with a method of image recognition process that is at least one method selected from among a plurality of methods, and
wherein the extraction regions do not overlap with each other.

2. The article production apparatus according to claim 1, wherein the conveying apparatus has a plurality of conveyance regions.

3. The article production apparatus according to claim 2, wherein the object is conveyed to each of the plurality of conveyance regions, and data extraction from the captured image data is performed for each of the plurality of conveyance regions.

4. The article production apparatus according to claim 1, wherein, at the plurality of extraction regions, the image recognition process is performed using different methods respectively.

5. The article production apparatus according to claim 4, wherein sizes of the plurality of extraction regions are different in accordance with used methods of image recognition process.

6. The article production apparatus according to claim 1, wherein, in the image processing apparatus, at least one of the plurality of the method is a pattern matching process.

7. The article production apparatus according to claim 1, wherein, in the image processing apparatus, at least one of the plurality of the methods is a contour detection process.

8. The article production apparatus according to claim 1, wherein, in the image processing apparatus, the extracted image data is stored without being compressed or compressed using lossless compression.

9. The article production apparatus according to claim 1, wherein, in the image processing apparatus, entire captured image data is compressed using lossy compression and stored with the extracted image data.

10. The article production apparatus according to claim 1, wherein positions and sizes of the plurality of extraction regions are determined in accordance with the methods of image recognition process.

11. An article production method comprising:
conveying at least one object by a conveying apparatus;
capturing image data of the conveyed object by an imaging apparatus;
performing image recognition process on the captured image data of the object, thereby obtaining position information of the object by an image processing apparatus;
storing image data extracted from the captured image data into a storage device by the image processing apparatus;
performing image data extraction process from
a plurality of extraction regions of the captured image data by the image processing apparatus,
wherein the plurality of extraction regions is determined in accordance with a method of image recognition process that is at least one method selected from among a plurality of methods, and
wherein the extraction regions do not overlap with each other; and
controlling operation of a robot on a basis of the position information of the object by the robot controller, thereby causing the robot to perform processing or assembly on the object to produce an article.

12. The article production method according to claim 11, wherein, at the plurality of extraction regions, the image recognition process is performed using different methods respectively.

13. The article production method according to claim 11, wherein positions and sizes of the plurality of extraction regions are determined in accordance with the methods of image recognition process.

14. The article production method according to claim 13, wherein the sizes of the plurality of extraction regions are different in accordance with used methods of image recognition process.

15. An article inspection apparatus, comprising:
an imaging apparatus configured to capture image data of at least one article; and
an image processing apparatus configured to perform image recognition process on the captured image data and store image data extracted from the captured image data into a storage device, wherein the image processing apparatus inspects a state of the article using the extracted image data, the image processing apparatus including,
a control device capable of extracting image data from a plurality of extraction regions of the captured image data;
wherein the plurality of extraction regions is determined in accordance with a method of image recognition process that is at least one method selected from among a plurality of methods, and
wherein the extraction regions do not overlap with each other.

16. The article inspection apparatus according to claim 15, wherein, at the plurality of extraction regions, the image recognition process is performed using different methods respectively.

17. The article inspection apparatus according to claim 15, wherein positions and sizes of the plurality of extraction regions are determined in accordance with the methods of image recognition process.

18. The article inspection apparatus according to claim 17, wherein the sizes of the plurality of extraction regions are different in accordance with used methods of image recognition process.

19. An article inspection method, comprising:
capturing an image data of at least one article by an imaging apparatus;
performing image recognition process on the captured image data of the article by an image processing apparatus;
storing image data extracted from the captured image data into a storage device by the image processing apparatus;
inspecting a state of the article using the extracted image data by the image processing apparatus; and
performing image data extraction process from a plurality of extraction regions of the captured image by the image processing apparatus,
wherein the plurality of extraction regions is determined in accordance with a method of image recognition process that is at least one method selected from among a plurality of methods, and
wherein the extraction regions do not overlap with each other.

20. The article inspection method according to claim 19, wherein, at the plurality of extraction regions, the image recognition process is performed using different methods respectively.

21. The article inspection method according to claim 19, wherein positions and sizes of the plurality of extraction regions are determined in accordance with the methods of image recognition process.

22. The article inspection method according to claim 21, wherein the sizes of the plurality of extraction regions are different in accordance with used methods of image recognition process.

\* \* \* \* \*